(12) United States Patent
Wiesmann et al.

(10) Patent No.: US 6,870,967 B2
(45) Date of Patent: Mar. 22, 2005

(54) PRETRIMMING OF TUNABLE FINITE RESPONSE (FIR) FILTER

(75) Inventors: Dorothea W. Wiesmann, Zurich (CH); Folkert Horst, Zurich (CH); Bert Offrein, Langnau am Albis (CH); Gian-Luca Bona, Hedingen (CH)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 10/268,637

(22) Filed: Oct. 10, 2002

(65) Prior Publication Data

US 2004/0071380 A1 Apr. 15, 2004

(51) Int. Cl.[7] ............................................... G02B 1/01
(52) U.S. Cl. .................... 385/1; 385/2; 385/3; 385/129
(58) Field of Search ............................. 385/1, 2, 3, 9, 385/14, 15, 16, 17, 31, 129

(56) References Cited

U.S. PATENT DOCUMENTS

| | | | | |
|---|---|---|---|---|
| 5,064,684 A | * | 11/1991 | Mir et al. ................... | 427/555 |
| 5,522,004 A | * | 5/1996 | Djupsjobacka et al. ..... | 385/123 |
| 5,891,747 A | * | 4/1999 | Farah .......................... | 438/31 |
| 6,285,810 B1 | * | 9/2001 | Fincato et al. ................ | 385/24 |
| 6,631,232 B1 | * | 10/2003 | Azami ......................... | 385/123 |
| 6,690,844 B2 | * | 2/2004 | Deliwala ....................... | 385/2 |
| 2001/0026655 A1 | * | 10/2001 | Park et al. ..................... | 385/14 |
| 2002/0015155 A1 | * | 2/2002 | Pechstedt et al. ........... | 356/477 |
| 2002/0076131 A1 | * | 6/2002 | Mohtat et al. ................ | 385/14 |

* cited by examiner

Primary Examiner—K. Cyrus Kianni
(74) Attorney, Agent, or Firm—F. Chau & Associates, LLC

(57) ABSTRACT

A method of inducing phase changes in a FIR filter is provided. The FIR filter consists of a concatenation of tunable couplers and tunable delay lines made of planar waveguides fabricated in SiON technology, forming a plurality of interferometers, at least one of which carries a heater on at least one of its waveguide arms. The method includes the step of exposing at least one of the arms of the interferometers to an irradiation at UV or a smaller wavelength, thereby inducing a change in the refractive index of the waveguide arms which induces the phase difference change. The method provides a procedure that will lead to temperature-stable changes of the refractive index of the waveguides. The resulting device is temperature-stable such that it can be afterwards be heated with chromium heaters to dynamically tune its spectral response without destroying the UV-induced changes.

13 Claims, 2 Drawing Sheets

PRETRIMMING OF TUNABLE FINITE RESPONSE (FIR) FILTER

FIELD OF THE INVENTION

The present invention relates to dynamic finite response (FIR) filters. More specifically, the invention relates to such filters realized in waveguides. Still more specifically, the invention relates to the pretrimming of such filters.

BACKGROUND OF THE INVENTION

A method for increasing the transmission capacity of optical fiber communication networks without establishing more optical transmission lines is wavelength-division multiplexing. In these systems generally known as wavelength-division multiple transmission systems, a plurality of signal light beams having wavelengths different from one another are employed to optically transmit the resultant optical signals.

In these wavelength-division multiplexed networks constituent light beams can incur a dispersion between their intensity or phase. An intensity dispersion can be caused by a gain dispersion of an optical amplifier employed in a middle and long distance optical fiber communications system for amplifying a signal light beam which has been attenuated through a transmission line fiber. As the optical amplifier, there is widely used an optical fiber amplifier for amplifying directly a signal light beam with a rare-earth doped optical fiber as an amplification medium. Also, as the amplification medium of the optical fiber amplifier, the rare-earth doped optical fiber is employed. In this connection, there is generally known an EDFA (an Erbium Doped Fiber Amplifier) employing erbium elements as dopant.

However, if the constituent signal light beams of the wavelength division multiplexed signal light beam are intended to be optically amplified by the optical fiber amplifier, the dispersion between the gains for the constituent signal light beams due to the wavelength characteristics of the gain of the erbium doped optical fiber, i.e., the degradation of the flatness of the gains becomes a problem. For the purpose of improving the gain flatness, an optical filter is employed.

The introduction of optical amplification in wavelength-division multiplexed networks enables longer transmission distances. However, with increased transmission distances and higher bit rates per signal channel, fiber dispersion becomes a problem. Fiber dispersion causes the pulses to broaden. If the fiber dispersion is large enough, pulses in constituent signal channels may overlap in time and cause loss of transmitted information. Thus, filters are needed for performing phase dispersion compensation.

All the above mentioned filter functions can be performed by filters consisting of a concatenation of tunable couplers and tunable delay lines forming a so-called finite impulse response (FIR) filter.

Optical transmission systems, such as optical couplers, are formed from a plurality of waveguides which each include a core and a cladding. In the optical coupler, two or more waveguides are arranged adjacent to and closely separated from one another. An optical coupler splits lightwaves coherently in a manner similar to a beam splitter in bulk optics. The evanescent tail of the lightwave in one waveguide extends to the neighboring waveguide and induces electric polarization. The polarization generates a lightwave in the second waveguide which also couples back to the first waveguide in a well known manner. For a waveguide coupler, the fraction of the light coupled from the first waveguide to the second waveguide is known as the coupling ratio. The coupling ratio is dependent on a number of factors, including the refractive indices of the core and cladding of the waveguides and the separation between the waveguides. However, one limitation in the fabrication of optical couplers having coupling ratios that are precisely specified is that process control of the refractive indices of the cladding and core is often not sufficient to result in high yields for designs having such precise requirements.

Mach-Zehnder interferometers are known and are expected to find use, inter alia, in dense wavelength-division multiplexed optical communication systems. Such systems will typically require the ability to passively multiplex and de-multiplex channels at the link ends and, at least in some architectures, to add and/or drop channels at selected points on the link. These abilities can be provided by the above mentioned Mach-Zehnder devices, especially by such devices that comprise refractive index-gratings in both arms of an equal arm Mach-Zehnder-type wavelength interferometer.

Such devices, in order to provide acceptable performance, have to meet exact requirements on, e.g., equality of arm lengths and equality of grating strengths. R. Kashyap et al., IEEE Photonics Technology Letters, Vol. 5(2), p. 191 (February 1993), disclose a Mach-Zehnder-type interferometer fabricated in Ge-doped planar silica. Planar waveguide Mach-Zehnder-type interferometers can be relatively easily manufactured with essentially equal arm length, due to the close dimensional control obtainable with standard photolithography and etching techniques. Nevertheless, Kashyap et al. found imbalance in the arms that had to be compensated by trimming. This compensation was achieved by laser trimming of one photosensitive arm of the interferometer.

U.S. Pat. No. 5,768,452 discloses a method of trimming the coupling ratio of an optical coupler to a prescribed value. The optical coupler is formed from a plurality of waveguides. In accordance with this method, an irradiation energy is selected that is absorbed by portions of the waveguides located in a coupling region. A dosage of radiation is applied to the waveguide portion at least sufficient to adjust the optical coupling ratio to the prescribed value. The radiation, which may be absorbed by the cladding and/or core of the waveguides, causes a change in the refractive index difference between the core and cladding of the waveguides. This change in the refractive index difference will result in a change in the optical coupling ratio of the device. The respective optical coupler is stabilized so that the induced change in refractive index, and hence the value of the coupling coefficient, does not undergo substantial decay over time. Such stabilization is done by thermally annealing the coupler after exposing it to radiation.

Because of space limitations in planar waveguide technology, smaller bending radii compared to traditional fiber technology are required. Smaller bending radii, however, require a stronger guiding of the optical modes than in a straight waveguide or fiber. This is achieved by increasing the refractive index contrast between core and cladding as compared to the co-planar waveguide technology, which, however, leads to increased coupling losses. A good compromise between the minimum bending radius and coupling losses to the standard fiber and the necessary difference in the material composition between core and cladding resulting therefrom can be obtained, e.g., with an effective refractive-index contrast around 0.02. If the cladding is made of silica, i.e., $SiO_2$, which has a refractive index of 1.45, a material having a refractive index near 1.51 is desired for the core. However, limitations in the maximum achievable refractive-index-change by doping with P, Ge or other dopants and hence in the minimum attainable bending radius in the waveguide exist.

Waveguides with a much higher index contrast can be fabricated with silicon-oxinitride (SiON) core layers. An example for the use of SiON as a material for fabricating waveguides is given in U.S. Pat. No. 5,416,861.

An example for a method for increasing the index of refraction of a glassy material is disclosed in U.S. Pat. No. 5,500,031, wherein the material is treated with hydrogen under the application of heat. That method is not used to increase the index contrast of the material in general, i.e., all over the wafer, but would be used in local areas to compensate for fabrication inaccuracies or make custom changes to a more general design. The hydrogen incorporation, however, causes an increase of the propagation loss.

A typical fabrication technique is to deposit silicon oxinitride by means of a PECVD process using silane ($SiH_4$), nitrous-oxide ($N_2O$), and ammonia ($NH_3$) as gaseous precursors. Thus, hydrogen is embedded in SiON, which is then driven out to a great extent and replaced by nitrogen by means of two subsequent annealing processes (core and cladding).

Dianov et al., "Grating Formation in a Germanium Free Silicon Oxynitride Fiber", Electronics Letters, Vol. 33, No. 3, p. 236 ff., January 1997, disclose writing Bragg gratings in a germanium-free nitrogen-doped-silica-core fiber. The single mode fiber used was manufactured by hydrogen-free reduced-pressure surface plasma-chemical vapor deposition (SPCVD).

An optical signal processor being represented by an optical circuit of a lattice configuration is disclosed in U.S. Pat. No. 5,572,611. Its basic circuit structure comprises 3 dB directional couplers, two optical waveguides with equal optical path lengths, and two optical waveguides with different optical path lengths (an optical path difference of about 1 to 50 mm). Phase controllers for performing phase shift are provided on the optical waveguides. The portions with equal optical path lengths function as variable directional couplers, and variable directional couplers having arbitrary coupling rates can be constructed by changing the phase controllers on the optical waveguides with equal optical path lengths. As for an adaptive filter, there is adopted a construction in which a photodetector for withdrawing part of output is provided at the output port, and a feedback electric wiring for feedback control is laid.

The components to change the intensity, phase or path of the constituent signal light beams may consist of a concatenation of tunable couplers and tunable delay lines forming a so-called finite impulse response (FIR) filter. An example of such a device 6 is given in FIG. 1, where symmetric Mach-Zehnder interferometers 2 are depicted, together with asymmetric Mach-Zehnder interferometers 4.

With the help of chromium heaters on one arm of each interferometer an additional phase shift between the two arms can be induced and thus the coupling ratio and the frequency response of the tunable coupler and the tunable delay line, respectively, can be changed. This enables the construction of a desired total frequency response of the FIR filter. Usually the FIR filter would be designed to have a certain frequency response for the off-state of all heaters. However, due to small phase errors induced by inhomogeneities on the chip often this response cannot be achieved.

Thus, there is a need for trimming such a FIR filter of planar waveguides. In T. Erdogan, V. Mizrahi, P. J. Lemaire and D. Moore, "Decay of ultraviolet-induced fiber Bragg gratings", J. Appl. Phys. 76(1), 1994, it is reported that the use of a chromium heater close to a standard Ge-doped glass waveguide that is treated with UV-light would destroy a trimming as mentioned above over time, because the stability of the refractive index change is significantly lower at elevated temperatures. Hence, the stability of this effect with temperature would decrease very quickly.

Hence there is still a need to provide a trimming method that allows to operate the trimmed device at elevated temperatures without incurring stability problems.

SUMMARY OF THE INVENTION

It is therefore an aspect of the present invention to provide a procedure to trim an FIR filter fabricated in SiON technology with UV irradiation.

It is still another aspect of the present invention to provide such a procedure that will lead to temperature-stable changes of the refractive index of the waveguides. The resulting device is temperature-stable such that it can be afterwards be heated with chromium heaters to dynamically tune its spectral response without destroying the UV-induced changes.

Still another aspect of the invention is to provide a respective procedure without having to perform an annealing step after exposing the device to UV irradiation.

These and other aspect and advantages are achieved by the method disclosed in claim 1 and the FIR filter disclosed in claim 13.

Preferred embodiments of the invention are described in the dependent claims.

BRIEF DESCRIPTION OF THE DRAWINGS

Embodiments of the invention will be described in more detail hereinafter in connection with the drawings, in which.

DETAILED DESCRIPTION OF THE PREFERRED EMBODIMENT

Figure 1:
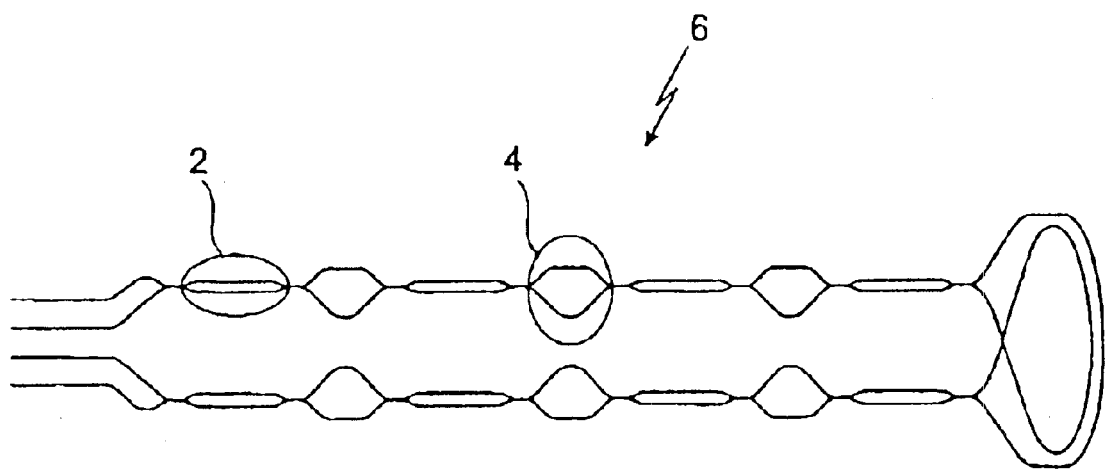
FIG. 1 shows a 7-stage folded FIR filter.

FIG. 1 shows an example of an FIR filter 6 consisting of a concatenation of tunable couplers, here realized in the form of symmetric Mach-Zehnder interferometers 2 and tunable delay lines, here realized in the form of asymmetric Mach-Zehnder interferometers 4. This concatenation may be used as a gain equalizer, as a dispersion compensator or an optical add-drop multiplexer.

With the help of chromium heaters on one arm of each interferometer an additional phase shift between the two arms can be induced and thus the coupling ratio and the frequency response of the tunable coupler and the tunable delay line, respectively, can be changed. This enables the construction of a desired total frequency response of the FIR filter. Usually the FIR filter would be designed to have a certain frequency response for the off-state of all heaters. However, due to small phase errors induced by inhomogeneities on the chip often this response cannot be achieved.

The method suggested changes the phase in the interferometers permanently, which means that under usual operating conditions like typically 100° C. for a time period of 10 kh, no or only negligible change of the UV induced refractive index is observed after the fabrication is completed. i.e., during normal use of the filter.

When referring to SiliconOxyNitride or SiON, a member of the series of $SiO_xN_y$ compounds is meant, i.e., a member of the series of compounds that include the binary compounds $SiO_2$, i.e., effectively the oxide concentration x therein being x=2, and the nitride concentration y being y=0, and $Si_3N_4$, i.e., effectively x=0, y=4/3. A preferred range therein is 0<y<4/3 and 0<x<2. An even more preferred range is 0.01<y<10 mol % and 0.01<x<90 mol %.

Figure 2:
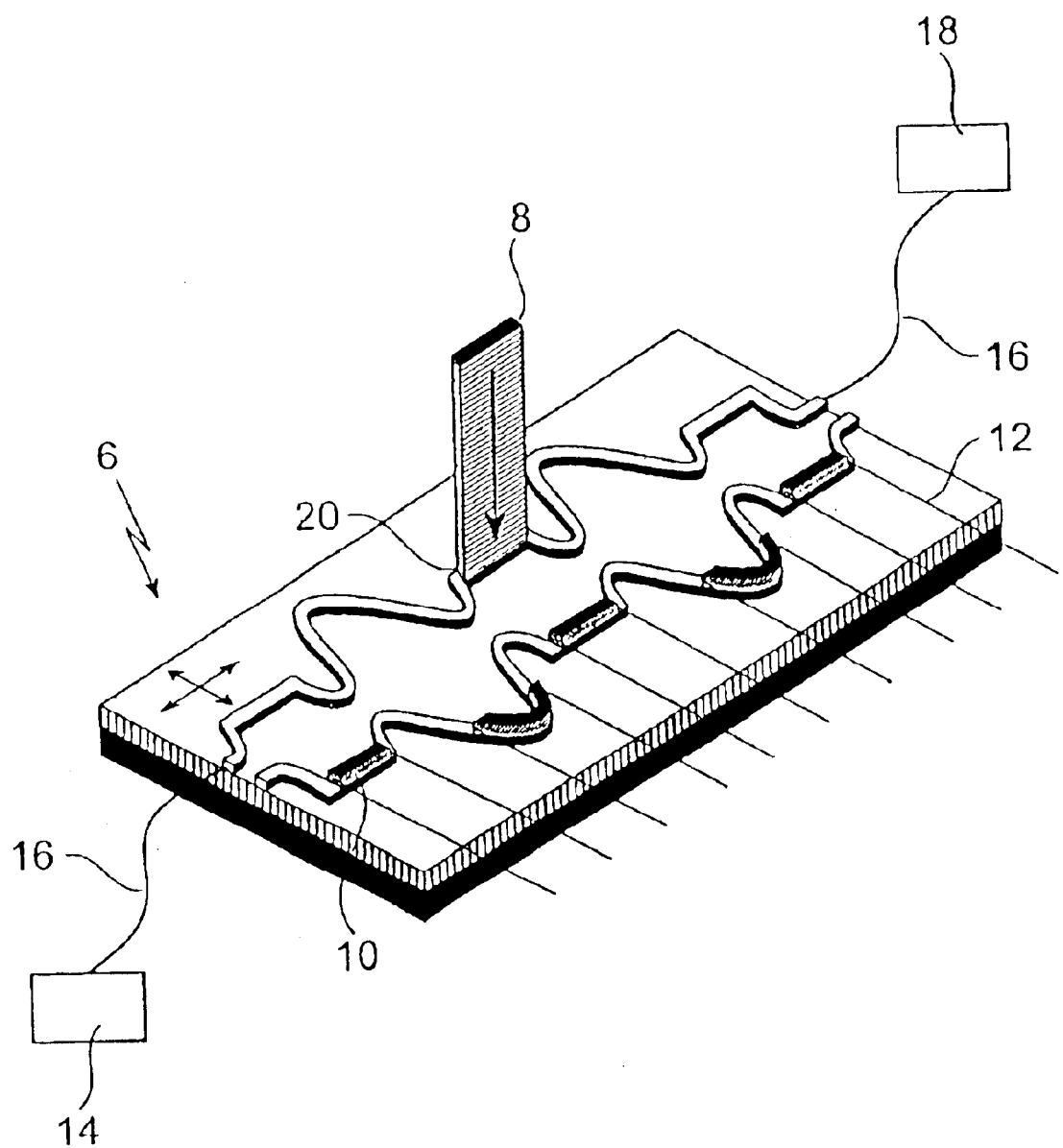
FIG. 2 schematically depicts the irradiation process.

The procedure is as follows and the arrangement therefor is depicted in FIG. 2. The UV-induced trimming can be used for two distinct purposes, on the one hand correcting process inaccuracies, on the other hand trimming a more general design to a custom design in order to allow different default (passive) FIR filter spectra from a single lithography mask. In the first case, the initial phase would be unknown and hence be first determined, in the second case, the initial phase could be known already and still a trimming would be performed. The phases of the interferometers after the fabrication are determined. Preferably, the heaters are therefor in the off-state. On the other hand, the desired phase for achieving a target frequency response are determined. A theoretical model as described in B. J. Offrein et al., "Adaptive FIR filter in high-index-contrast SiON technology", IEEE Photon. Techn. Lett., 12(5), 2000, may be used therefor. This results in the phase changes to be induced. The FIR filter 6 is moved under the UV beam 8 to position the arm 20 to be trimmed underneath (see the two double arrows on the FIR filter 6) and one interferometer after the other is then trimmed by exposing the arm 7 without the chromium heater 12 (being connected by contacts 12) to UV-light from an ArF excimer laser ($\lambda$=193 nm). The trimming can also be performed simultaneously. In general, a wavelength smaller or equal to 193 nm may be used. A $2\pi$ phase shift can, e.g., be achieved with a fluence of 170 mJ/cm$^2$ and 10000 pulses over a length of 2 mm. Smaller changes can be achieved with either a smaller fluence or fewer pulses. The dependence is non-linear and should be determined ahead of time, what can easily be done by a skilled worker.

If desired, the phase change can be observed in-situ by launching light from a broadband light source 14 by a single-mode connecting fiber 16 into the waveguide. The transmitted light is detected with an optical spectrum analyzer 18. With the known initial phases the transmission of the FIR filter can be simulated with the transfer matrix method as is also reported in Offrein et al., mentioned above. This can also be done for the FIR filter with one trimming delay line. The exposure of each arm can be stopped when the desired intermediate frequency response (transmission spectrum) of the FIR filter is achieved. In-situ observations will ensure more accurate phase settings than the sole exposure to a certain number of pulses that have been predetermined from the material's general photosensitivity.

Figure 3:
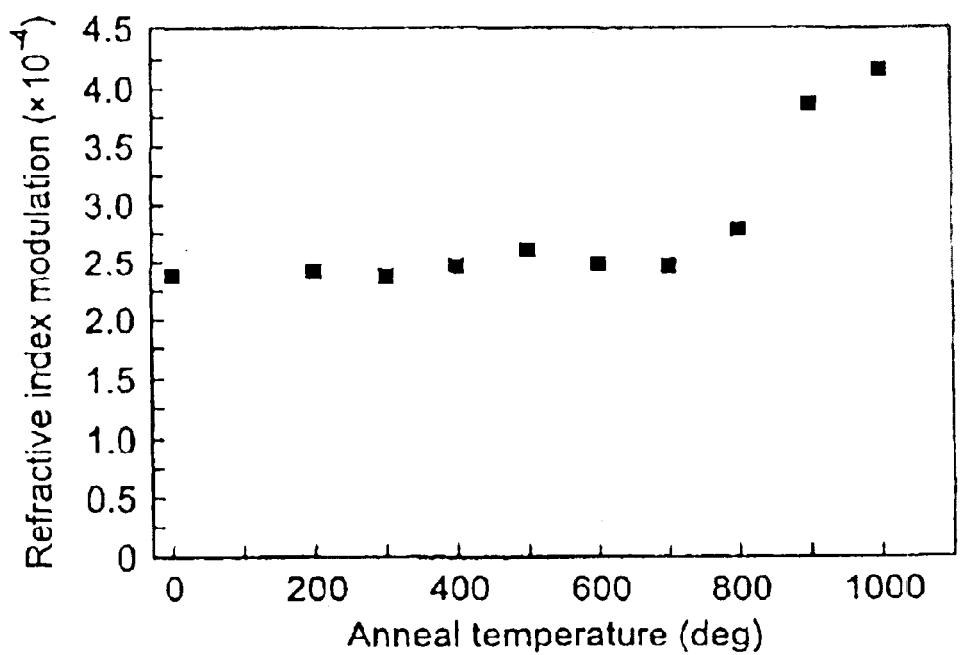
FIG. 3 shows the refractive index modulation of a trimmed optical coupler during the course of subsequent thermal annealing.

Experiments have revealed that the induced refractive-index changes and thus phase changes in SiON planar waveguides are very temperature-stable. No fading is observed up to 1000 degrees Celsius in a time frame of half an hour. Whereas for standard telecommunication fibers that are doped with germanium instead of nitrogen, the refractive-index change starts to decay at 80° C., it can be seen from FIG. 3 that the effect achieved with the method according to the invention shows a higher temperature stability.

The trimming method according to the invention not only enables the custom creation of a certain attenuation curve from the same lithography mask layout but also allows for the correction of small phase errors included by (unavoidable) inhomogeneities on the chip, e.g., in the refractive index. The default wavelength characteristics can afterwards be modified by heating if dynamic changes are necessary.

The effect shows only at the point where UV light hits the probe. It can hence be locally defined by focusing or defocusing the light beam.

What is claimed is:

1. A Method of inducing a phase change in a finite response filter, which comprises a concatenation of tunable couplers, and at least one tunable delay line, both comprising planar SiON-based waveguide arms, said tunable couplers and said at least one tunable delay line forming a plurality of interferometers, at least one of which carries a heater on at least one of its wave guide arms, characterized in that at least one of said arms of the interferometers is exposed to an irradiation at UV or a smaller wavelength, thereby inducing a change in refractive index which induces said phase difference change, wherein the characterized step comprises the additional steps of:
   a) determining an initial phase difference for an optical signal transmittable in the waveguide arms of at least one of said interferometers;
   b) determining a desired phase difference for a target frequency response; and
   c) comparing the phase differences of steps a) and b) and calculating therefrom a phase difference change to be induced,
   before exposing said at least one of said arms of the interferometers to said irradiation.

2. The Method according to claim 1, wherein said heaters are selected to comprise a chromium layer.

3. The Method according to claim 1, wherein said waveguides are selected to include a waveguide cladding and a waveguide core that is provided with absorption sites for said irradiation.

4. A Method of inducing a phase change in a finite response filter, which comprises a concatenation of tunable couplers, and at least one tunable delay line, both comprising planar SiON-based waveguide arms, said tunable couplers and said at least one tunable delay line forming a plurality of interferometers, at least one of which carries a heater on at least one of its waveguide arms, characterized in that at least one of said arms of the interferometers is exposed to an irradiation at UV or a smaller wavelength, thereby inducing a change in refractive index which induces said phase difference change, wherein no substantial change of the UV induced refractive index change takes place in case said at least one heater is switched on when said filter is in use.

5. A Method of inducing a phase change in a finite response filter, which comprises a concatenation of tunable couplers, and at least one tunable delay line, both comprising planar SiON-based waveguide arms, said tunable couplers and said at least one tunable delay line forming a plurality of interferometers, at least one of which carries a heater on at least one of its wave guide arms, characterized in that at least one of said arms of the interferometers is exposed to an irradiation at UV or a smaller wavelength, thereby inducing a change in refractive index which induces said phase difference change, wherein said waveguides are selected to include a waveguide cladding and a waveguide core that is provided with absorption sites for said irradiation, and wherein said absorption sites are provided by one or more of:

depositing said waveguide onto a substrate with a different thermal expansion coefficient;

doping said waveguide core preferably with nitrogen; and inducing thermal stress.

6. A Method of inducing a phase change in a finite response filter, which comprises a concatenation of tunable couplers, and at least one tunable delay line, both comprising planar SiON-based waveguide arms, said tunable couplers and said at least one tunable delay line forming a plurality of interferometers, at least one of which carries a heater on at least one of its waveguide arms, characterized in that at least one of said arms of the interferometers is exposed to an irradiation at UV or a smaller wavelength, thereby inducing a change in refractive index which induces said phase difference change, wherein said irradiation is produced by using a pulsed ArF excimer laser.

7. The Method according to claim 6, wherein a 2Σ phase shift of a signal beam with a wavelength of 1550 nm is produced by applying irradiation from an ArF laser with a fluence of 170 mJ/cm$^2$ and 10000 pulses over a length of 2 mm.

8. The Method according to claim 6, wherein the irradiation is focused into a selected portion of the waveguide.

9. The Method according to claim 6, wherein said waveguides are provided by using a PECVD process.

10. The Method according to claim 6, wherein said waveguides are provided on a silicon substrate.

11. The Method according to claim 6, wherein said waveguide core is provided comprising a SiON-based material, and the waveguide cladding comprising a SiO$_2$-based material.

12. A FIR filter, comprising a concatenation of tunable couplers made of planar waveguides and at least one tunable delay line, both comprising planar SiON-based waveguides, said tunable couplers and said at least one tunable delay line forming a plurality of interferometers, and wherein at least one of said interferometers carries a heater on at least one of its arms, wherein a phase change is inducible into said waveguides by exposing at least one of the anus of the interferometers to an irradiation at UV or a smaller wavelength, wherein said waveguides comprise a core and a cladding and wherein said UV irradiation is absorbable by the core or the cladding.

13. Use of a filter according to claim 12 as a dynamic gain equalizer, a dispersion compensator or an optical add-drop multiplexer.

* * * * *